H. FERRIS.
HAND SHOCKING DEVICE.
APPLICATION FILED APR. 20, 1910.
983,038.
Patented Jan. 31, 1911.
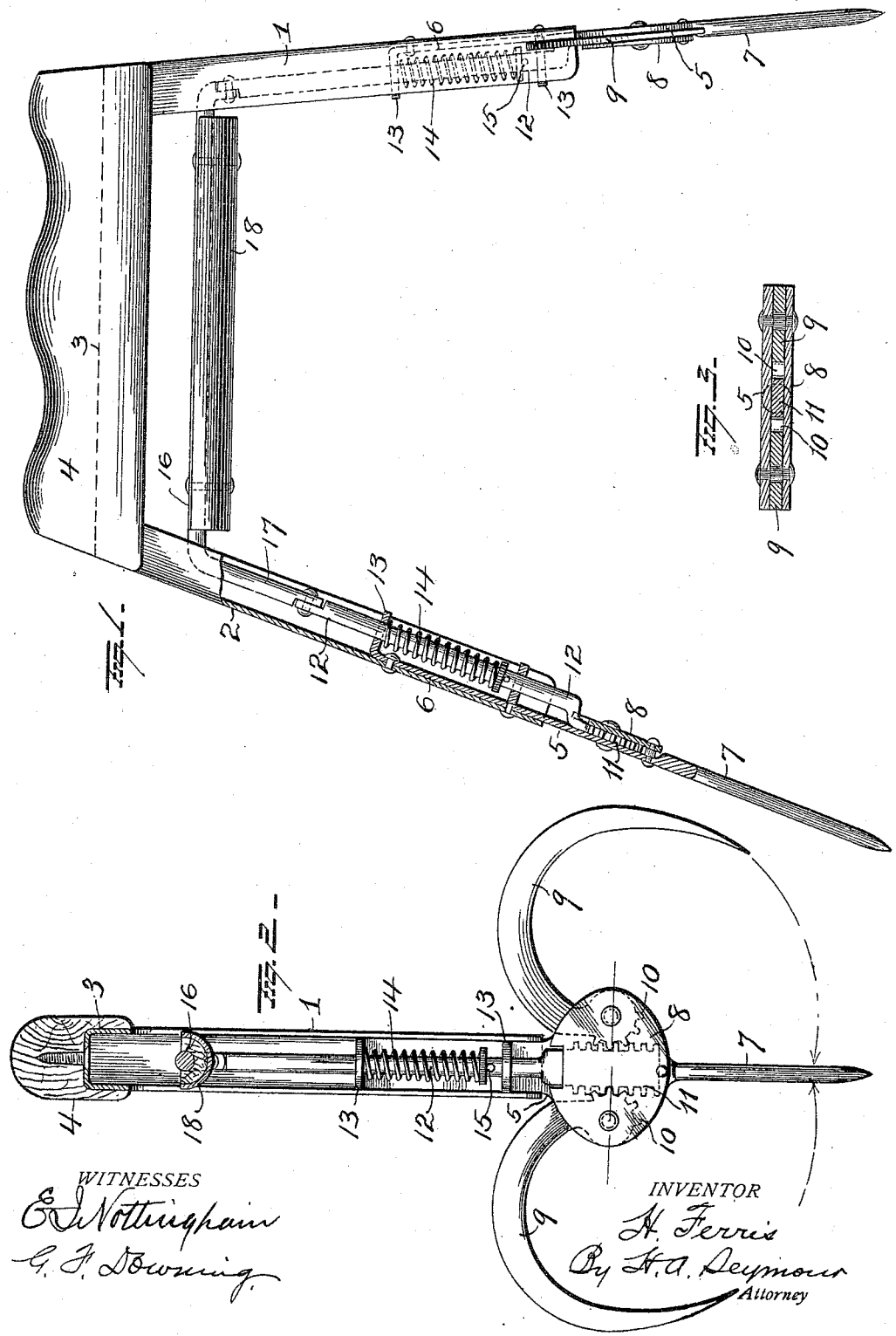

UNITED STATES PATENT OFFICE.

HENRY FERRIS, OF ARDOCH, NORTH DAKOTA.

HAND SHOCKING DEVICE.

983,038.  Specification of Letters Patent.  Patented Jan. 31, 1911.

Application filed April 20, 1910. Serial No. 556,634.

*To all whom it may concern:*

Be it known that I, HENRY FERRIS, of Ardoch, in the county of Walsh and State of North Dakota, have invented certain new and useful Improvements in Hand Shocking Devices; and I do hereby declare the following to be a full, clear, and exact description of the invention, such as will enable others skilled in the art to which it appertains to make and use the same.

This invention relates to improvements in hand shocking devices,—the object of the invention being to so construct such a device that the user will be enabled to readily pick up a bundle of grain and convey it to a shock and then easily release said bundle.

A further object is to construct a hand shocking device in such manner that it can be easily carried and operated by the hand without necessitating the user to hold his hand in a cramped position and so that the operator will have free use of his fingers for operating grappling arms which are caused to engage the bundle of grain to be carried.

With these and other objects in view the invention consists in certain novel features of construction and combinations of parts as hereinafter set forth and pointed out in the claims.

In the accompanying drawings, Figure 1 is a side elevation partly in section of a hand shocking device embodying my improvements. Fig. 2 is a vertical section, and Fig. 3 is a detail view.

1—2 represents arms projecting from the respective ends of a cross member 3,—the arm 2 being made somewhat longer than the arm 1 and disposed at an obtuse angle to the cross member 3. The arms 1—2 and cross member 3 may be conveniently made of sheet metal bent to form channels, and to the cross member 3, a handle portion 4 of wood or other suitable material is secured and shaped to accommodate itself to the hand of the user.

A plate 5 is located at the free end of each arm 1—2 and provided with a shank 6 entering the adjacent arm and securely riveted thereto. Each plate 5 is provided with a forwardly projecting tang 7 disposed in longitudinal alinement with the arm to which said plate is secured. A plate 8 is secured to but slightly spaced from each plate 5 and between each pair of plates 5—8 two curved grappling fingers or arms 9 are pivotally mounted. The grappling arms of each pair are provided near their pivoted ends with teeth 10, to which motion is imparted by rack-bars 11. Each rack-bar 11 is positioned longitudinally between the plates 5—8 and is provided in both of its side edges with teeth to mesh with the teeth 10 on the grappling arms and cause the latter to be swung on their pivotal supports and grasp a bundle of grain or release the same according to the direction in which the rack-bar is moved. Each rack-bar 11 is provided with a rod or shank 12 passing freely through perforated lugs or ears 13 projecting from the shank 6 within the adjacent arms 1 or 2. A spring 14 encircles each rod or shank 12 and bears at one end against one of the lugs or ears 13 and at the other end against a pin 15 secured to the rod or shank 12,—said spring serving to move the rack-bar in a direction to maintain the grappling arms normally apart.

A finger bar 16 is located approximately parallel with the cross or handle member 3 and provided at one end with an arm 17 projecting therefrom at an obtuse angle and pivotally connected at its lower end with the upper end of the rod or shank 12 in the longer arm 2. The other end of the finger bar is pivotally attached to the upper end of the rod or shank 12 in the shorter arm 1. A curved cover plate or strip 18 is secured to the under side of the finger bar to form a comfortable bearing for the fingers of the operator.

The operator will hold the device with longer forwardly projecting arm 2 farthest removed from his body and after causing the tangs to penetrate a bundle of grain he will, by operating the finger bar, cause the pairs of grappling arms to grasp the bundle of grain. The user can now carry the bundle of grain to the shock and readily release it by removing his fingers from the finger bar and permitting the grappling arms to be opened by the operation of the spring actuated rack and segment devices.

Having fully described my invention what I claim as new and desire to secure by Letters-Patent, is:—

1. In a device of the character described, the combination with two arms and a handle member connecting their upper ends, of a pair of grappling arms carried by each of said first mentioned arms, operating devices for said grappling arms, and a finger bar disposed between the first mentioned arms and substantially parallel with the under face of the handle member and connected with said operating devices.

2. In a device of the character described, the combination with an arm and a handle member at one end thereof, of a plate at the other end of said arm and provided with a shank secured to the arm, perforated lugs on said shank, a longitudinally movable rack-bar provided with a rod passing through the perforated lug on said shank, grappling fingers pivoted to said plate at respective sides of the rack-bar and having rack teeth to mesh with the teeth of the rack-bar, and a finger bar connected with the rod of the rack-bar.

3. In a device of the character described, the combination with two channel arms and a cross-member connecting their upper ends, of plates at the lower ends of said arms, and provided with shanks secured within said channel arms, grappling fingers pivotally connected with said plates and provided with rack-teeth, a rack-bar passing between each pair of grappling fingers and meshing with the rack-teeth thereon, each rack-bar having a rod entering the adjacent channel arm, springs for moving said rod in one direction, and a finger bar under said cross member and connected with the upper ends of the respective rods.

4. In a device of the character described, the combination with a handle member and arms projecting from respective ends thereof, one of said arms projecting from the handle member at a greater angle than the other, grappling fingers pivotally supported at the lower ends of said arms and provided with rack teeth, rack-bars passing between the respective pairs of grappling fingers and meshing with the rack teeth thereon, each of said rack-bars provided with a rod, springs for moving said rods in one direction, and a finger bar disposed between said arms and substantially parallel with the under face of the handle member, said finger bar having both of its ends pivotally connected with the upper ends of the rods on the rack-bars.

In testimony whereof, I have signed this specification in the presence of two subscribing witnesses.

HENRY FERRIS.

Witnesses:
   CHAS. DREW,
   JOHN HOBBS.